(No Model.) 2 Sheets—Sheet 2.
W. A. STEARNS.
WHEELED SCRAPER.
No. 282,681. Patented Aug. 7, 1883.
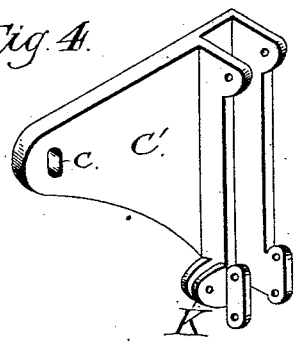
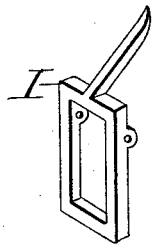
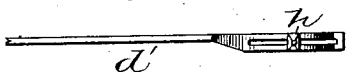
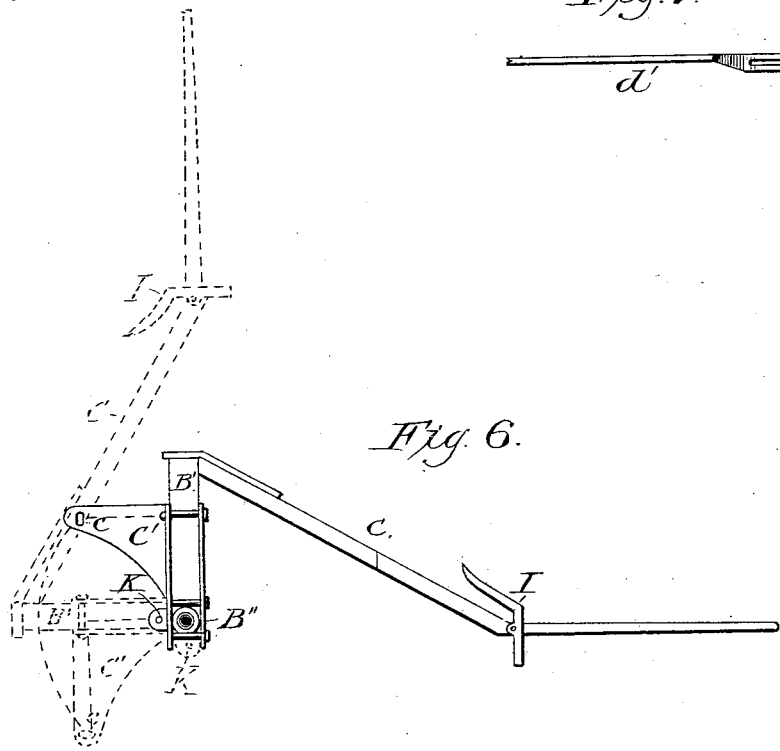
Witnesses:
H. McDonald
J. J. Parker
Inventor,
Waldo A. Stearns,
Per Jas. T. Drummond
Atty.

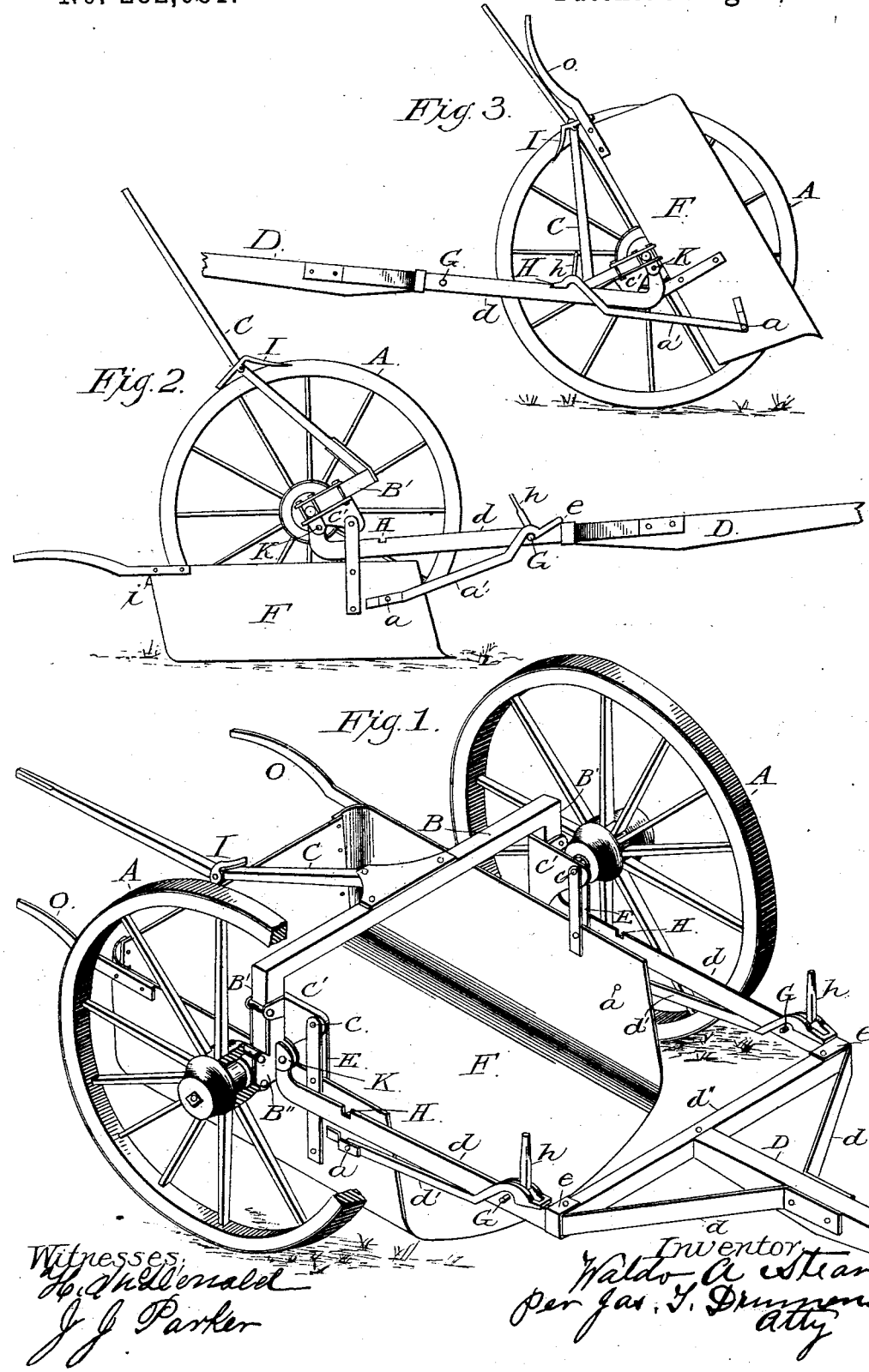

UNITED STATES PATENT OFFICE.

WALDO A. STEARNS, OF ST. JOSEPH, MISSOURI.

WHEELED SCRAPER.

SPECIFICATION forming part of Letters Patent No. 282,681, dated August 7, 1883.

Application filed December 13, 1882. (No model.)

*To all whom it may concern:*

Be it known that I, WALDO A. STEARNS, residing at St. Joseph, in the county of Buchanan and State of Missouri, have invented certain new and useful Improvements in Wheeled Earth-Scrapers, of which the following is a specification.

My invention relates to improvements in the manner of attaching the draft to the scoop while it is being filled with earth, and the mechanism for lifting a loaded scoop for transporting its load, and for sustaining the loaded scraper-box in said elevated position, and for holding the empty scoop in a partly-inverted position while traveling.

The objects of my invention are, first, to secure a draft connected with the scoop while filling that precludes the possibility of prematurely tipping over or dumping during said operation by its edge coming in contact with hard substances or through lack of skill in the operator; second, to lessen the resistance to the operator in raising a loaded scoop; third, to lessen the resistance to the operator and to the draft animals in dumping or discharging the load of a scoop; fourth, to provide improved mechanism for sustaining a loaded scoop while traveling or transporting the load; fifth, to provide improved means of holding the empty scoop in a partially-inverted position.

My invention consists of the mechanism for accomplishing the above-named objects, as herein described and shown by the accompanying illustrative drawings, which constitute part of this specification, and is particularly set forth in the claims hereunto attached.

Of the drawings, Figure 1 is a perspective of the whole machine embodying my invention, the said machine being in position with the scoop raised, as when traveling with a load. Fig. 2 is a side elevation, having the scoop lowered for filling. It is, however, represented with one wheel detached. Fig. 3 is a similar view of the machine with the scoop in a partly-inverted position, as when traveling empty. Fig. 4 is a perspective view of one supporting-lug or forward projection as detached. Fig. 5 is a perspective of a loop-catch for sustaining the rear end of the scoop. Fig. 6 is a side view, showing the axle with a forward projection or supporting lug and operating-lever attached thereto, and also with the loop-catch attached to the said lever, showing also, by dotted lines, the position of said parts when the scoop is lowered for filling, and the arc described by the bearing-points in said supporting-lugs. Fig. 7 is a plan view of the forward end of one of the draft-bars.

Similar letters of reference indicate like parts throughout the drawings, of which—

A represents the wheels of the machine. B is the axle, having rectangular bends B' and B''. C is an operating-lever rigidly fastened to the middle of the axle B, at a proper angle to strike the rear end of the scoop F when said scoop is in a raised position, with the bends B' of the axle standing in a vertical position.

I am aware that wheeled scrapers have been made having a curved or rectangular axle-beam arranged as their lifting device, which beam is provided with spindles for traveling or carrying wheels affixed to its short or right-angled sections as fulcrums for said lifting device, and arranged in such a manner that a loaded scoop is suspended from the forward projecting ends of said beam, and, when in a raised position, that said beam and a straight hand-lever attached to its center section and projecting outward parallel with its right-angled bends will lie in a horizontal position on a common plane and level with the spindles, which arrangement of parts, owing to their close proximity to each other in the action of folding said axle-beam and hand-lever backward and downward over the ascending scoop filled with dirt, causes them often to strike lumps or other bulky or hard substances in said scoop, so as to obstruct or hinder a proper closing together of said parts for convenience in coupling said lever with the hind end of the scoop, said coupling being a means of carrying the same. The said obstruction or pressure against dirt causes a heavier lift in raising the load or closing said parts for coupling—equal to the power required for crushing the obstructing clod—or in some way pressing said obstruction so as to compress it sufficiently for said parts to close together. Wheeled scrapers have also been made having rectangular bent axles, with a straight operating-lever attached to the center of the arched or central section of said axle, so as to lie in a horizontal position directly over the scoop when it is raised and when the right-angled bends of said axle stand vertically, and having side braces attached to said lever, whose bearings attach to said axle near the spindle-sections, which arrangement partakes of the same difficulty above stated. The lever C in my invention is rigidly and firmly attached to the elevated part of the axle in a relative drooping position, as above described, which is done by means of a broad plate enveloping or encircling enough of said axle to give sufficient strength without the aid of lateral braces, and by said lever being bent, as shown, and thus attached to the arched part of an axle high enough to clear the load. The trouble arising from the above-named appendages coming in contact with the load in raising the scoop is thereby avoided. The lever is also bent at its middle, so that its outer end will extend horizontally to the rear when in its lowered position, and will stand vertically at a point in rear of the axle and but slightly forward of the rear end of the scoop, thereby making it easier of access and more convenient for the attendant to handle in raising a load than levers standing perpendicular over the axle and over the scoop forward of its center when such scoop is in a lowered position, as is the case in the above-named machines. It is also provided with the loop-catch I, pivoted to it near its bend, said loop being pivoted through forward-projecting lugs, which conformation sustains the loop at a proper angle by its upper cross-section impinging upon the lever C for the lower end or cross-section of said loop to strike the catch $i$ upon the scoop F, the said lower end being free to move backward as it slides downward over the slope of catch $i$, so as to take under the same, thereby coupling said scoop and said lever together. Said loop I, shaped as shown in Fig. 5, has a handle on its upper cross-section by which the attendant may take hold of and free it from the catch $i$, when it is desired to lower the scoop for filling, by means of a downward pressure thereon. The manner of pivotally suspending the loop forward of the bar across the top allows a swinging backward of the lower part of the loop; but the said bar prevents the opposite motion, which motion would permit the loop to pass as readily either side of the rear end of the scoop, frequently missing connection with the catch. Said loop I may, if desirable, have a spring attached to the under side of its handle, so as to press against said lever for the purpose of giving it a more prompt action.

As a means of raising the loaded scoop, the triangular lugs or forward projections, C', as shown in Fig. 4, are provided, which, by being of a bracing form, are of great strength, and are made to partly envelop both of the bends of the axle at B' and at B'', which increases the strength of both the axle and said lugs or projections. Said lugs are provided with oblong holes at their forward projecting points, as shown at $c$, through which pins are inserted, and also through the holes in the upper ends of the hangers E, where said pins are tightly fitted, and constitute pivot-bearings for the scoop F, said scoop being suspended from said bearings by the depending hangers E, which hangers are rigidly fastened to either side of the scoop.

It will be observed, upon examination of Fig. 6, that by making a quarter backward rotation of the axle B the pivotal or bearing points $c$ in lugs C' are carried upward through an arc (being a part of a circle in a vertical position) approximating nearest a perpendicular, or whose chord makes a perpendicular, whereby the greatest possible lift is obtained, according to the amount of rotation made by said axle. Therefore a less projection of leverage forward of the fulcrum will be required to raise a load a given height with the same movement of the lever C than where the lifting is accomplished through a curve embracing either the lower or upper quarter of said circle, as is the case with wheeled scrapers now in use, whose construction or combination of lifting mechanism only serves to accomplish such results. Hence a material advantage in leverage is thus obtained by this my invention over said devices in raising a loaded scraper. In verification, the illustration at Fig. 6 serves to demonstrate that a forward projection of leverage equal to the distance direct from the center of pivots of fulcrum B'' to the bearings at $c$, making a quarter-rotation of the axle, would carry the bearing-points $c$ of the dotted lines to $c$ of the full lines, making a lift equal in height to the combined distance from the bearing-point $c$ to the center of the section B' of the axle at right angles with said bend, and thence parallel with said section to the center of the spindle or bend B'', while with the same leverage and length of stroke made through either the lower or upper quarters of said circle the lift would only equal the distance between said extreme points in a straight line, or equal to the radius of the curved dotted line in said figure, which line indicates the track of the bearing-point $c$ in the adjustment of said parts. The said lugs or projections are also provided with smaller bifurcated lugs K, into or between the forks of which are pivoted the tongue-bars $d$, which bars constitute the draft attachment after the scoop is filled and elevated for traveling. This mechanism also serves as a help in raising the load, as the draft of the team is thereby attached to points below the pivots of the axle, which causes the forward strain thereby exerted to aid in its rotation, producing said results. When the lever C is rotated backward in raising a load, the loop I, attached to said lever near its bend, will take under the catch $i$, and thereby couple said parts together, so as to carry said scoop in a balanced position.

The draft-bars $d'$, for coupling the draft of the team directly with the forward part of the scoop F when lowered and being filled with earth, are provided, and are formed as herein shown, having their forward parts vertically or obliquely slotted, with hooks near their forward ends and upon either side. Said forward ends at their points are arranged to slide upon the tongue-bars d lengthwise when required, and also to automatically hook over laterally-projecting pins G in the tongue-bars d. The rear ends of the draft-bars are pivoted to the sides near the forward part of the scoop, within lugs a, attached thereto, thereby constituting the coupling for said parts. Said bars d' also serve as braces to stay the scraper in a level position when carrying a load, or, more properly, to hold it from tilting backward with a preponderance of load in the rear of its swinging points, which is accomplished by the forward ends of said bars striking against the thick edges of the bands e, serving as stops when dumping a load. The forward or hooked ends of said bars (caused by a forward rotation of the scoop) slide back on the tongue-bars, and drop into the notches H in said bars, where they serve as braces to support the scoop in a semi-inverted position for traveling empty, as shown in Fig. 3. (Note: It will only be necessary to notch one of the tongue-bars, which would be convenient on the left side.) Said bars are also provided with handles h, rigidly fastened near their forward ends, by the use of which the operator may detach said bars from their detents in the tongue-bars d, in readiness for them to take the next required position. It will be necessary to continue the draft attachment to the forward part of the scoop after filling, until the latter shall have been raised sufficiently from the ground to clear it, and also to recouple the draft to the forward part of the scoop by transferring it to the draft-bars d' before the scoop strikes the ground in lowering it for filling, in same manner as the draft will be required to be attached to the scoop for dragging it while it is in contact with the ground. In the last half of the lowering of the scraper the pivot in the slot c seeks a greater rearward motion than the pivot of the tongue-bars in K, and the pin G being so placed in the hounds as to engage the hooks on draft-bars d' a little before the lowering is completed, and consequently the greater motion of the scoop than of the hounds being prevented thereby, the pins in the slots c must be allowed a forward movement relative to the upper angle of bracket. This is provided for by the slot c. The disengagement of the hooks on said draft-bars from the pins G in the tongue-bars is accomplished by their extreme forward ends resting upon the tongue-bars, causing the hooks in rear of said end to be raised above said pins by the elevation of the scoop, upon either side of which the lower ends of said draft-bars are connected. If preferred, notches may be made in the tongue-bars in lieu of the pins, and the closed upper end of the draft-bar made to drop into said notches when required, said end being extended forward so as to be raised out of the notches as the hooks are raised above the pins, and made with sufficient length of surface to prevent them from dropping into said notches when discharging the load. The draft being now entirely transferred to the tongue-bars, where it is applied at all times except when the scoop is being filled, as described, in dumping the loaded scoop is easily tilted over, the hooks on the draft-bars sliding over the pins G (in consequence, at the moment of passing, of the slight depression of the lower end of said draft-bars at their pivot-connection) in the rotation of the scoop. The operator uses either handle O or lever C for this purpose, and more readily raises the rear of the scoop than other machines whose draft is confined to the forward part of the scoop and not to the axle. For this reason (the draft being higher and farther to the rear) it requires but a slight effort of the team to complete the dumping or discharge of the load.

Having thus fully described my invention, so as to enable others skilled in the art to understand the same, what I claim as new, and desire to secure by Letters Patent, is—

1. In combination with the axle B, having rectangular bends B' and B'', the lever C and the scoop F, suspended by the hangers E, the lugs C', shaped as herein shown, being provided with bifurcated lugs K and the oblong holes c, all substantially as shown, and for the purpose specified.

2. In combination with an arched axle B and scoop F of a wheeled dirt-scraper, the lever C, bent as shown, and provided with a broad plate for attaching it firmly to said axle, and provided also with a catch-loop, I, near its bend for coupling it with the scoop, all constructed and arranged substantially as shown, and for the purposes specified.

3. In combination with the lever C and the catch i on the rear of the scoop F, the loop I, shaped and pivoted, as shown, to said lever, substantially as given, and for the purpose specified.

4. The tongue-bars d, provided with pins G and notches H, in combination with the draft-bars d', lugs C', axle B, cross-bar d'', and tongue D, all substantially as shown, and for the purpose set forth.

5. The draft-bars d', having vertically slotted and hooked forward ends, as shown, and made to operate with the tongue-bars d, in combination with said tongue-bars, the pins G, stops or bands e, lugs a, and the scoop F, substantially as herein shown, and for the purpose specified.

WALDO A. STEARNS.

Witnesses:
BEN. J. WOODSON,
WM. D. RUSK.